US012712230B2

(12) United States Patent
Jung et al.

(10) Patent No.: US 12,712,230 B2
(45) Date of Patent: Aug. 18, 2026

(54) SIDE FRAME FOR BATTERY CASE

(71) Applicant: POSCO Co., Ltd, Pohang-si (KR)

(72) Inventors: Chang-Gyun Jung, Incheon (KR); Sang-Kwon Wee, Incheon (KR); Kyu-Seung Jee, Seoul (KR)

(73) Assignee: POSCO CO., LTD, Pohang-si (KR)

( * ) Notice: Subject to any disclaimer, the term of this patent is extended or adjusted under 35 U.S.C. 154(b) by 663 days.

(21) Appl. No.: 18/027,522

(22) PCT Filed: Jun. 24, 2021

(86) PCT No.: PCT/KR2021/007925
§ 371 (c)(1),
(2) Date: Mar. 21, 2023

(87) PCT Pub. No.: WO2022/080623
PCT Pub. Date: Apr. 21, 2022

(65) Prior Publication Data

US 2023/0378583 A1 Nov. 23, 2023

(30) Foreign Application Priority Data

Oct. 12, 2020 (KR) ........................ 10-2020-0131082

(51) Int. Cl.
*H01M 50/242* (2021.01)
*B60L 50/64* (2019.01)
(Continued)

(52) U.S. Cl.
CPC ........... *H01M 50/242* (2021.01); *B60L 50/64* (2019.02); *H01M 50/204* (2021.01); (Continued)

(58) Field of Classification Search
None
See application file for complete search history.

(56) References Cited

U.S. PATENT DOCUMENTS 10,857,868 B2 12/2020 Schmidt et al.
2011/0143179 A1 6/2011 Nakamori
(Continued)

FOREIGN PATENT DOCUMENTS

EP 3352245 A1 7/2018
JP 2016-103491 A 6/2016
(Continued)

OTHER PUBLICATIONS

Machine Translation of JP-2018188106-A (Year: 2018).*
(Continued)

*Primary Examiner* — Gregg Cantelmo
(74) *Attorney, Agent, or Firm* — Morgan Lewis & Bockius LLP

(57) ABSTRACT

The present invention relates to a side frame for a battery case, which can achieve lightweight and cost reduction simultaneously while sufficiently protecting battery cells against the external shock, and the side frame for a battery case according to an embodiment comprises: a first frame unit formed to have an open end surface; and a second frame unit which is arranged in the first frame unit to close the open end surface of the first frame unit and is coupled to the first frame unit, wherein the first frame unit and the second frame unit may be formed of different materials from each other.

7 Claims, 5 Drawing Sheets

(51) Int. Cl.

| | |
|---|---|
| ***H01M 50/204*** | (2021.01) |
| ***H01M 50/209*** | (2021.01) |
| ***H01M 50/224*** | (2021.01) |
| ***H01M 50/233*** | (2021.01) |
| ***H01M 50/249*** | (2021.01) |
| ***H01M 50/262*** | (2021.01) |

(52) U.S. Cl.

CPC ....... *H01M 50/209* (2021.01); *H01M 50/224* (2021.01); *H01M 50/233* (2021.01); *H01M 50/249* (2021.01); *H01M 50/262* (2021.01)

(56) References Cited

U.S. PATENT DOCUMENTS

| | | | | |
|---|---|---|---|---|
| 2017/0050675 | A1* | 2/2017 | Kellner .................. | B62D 21/15 |
| 2018/0212212 | A1 | 7/2018 | Cao | |
| 2018/0287227 | A1 | 10/2018 | Jeong et al. | |
| 2018/0361875 | A1* | 12/2018 | Ruech ................. | H01M 50/249 |
| 2019/0207177 | A1 | 7/2019 | You | |
| 2021/0118803 | A1 | 4/2021 | Park et al. | |
| 2021/0119282 | A1 | 4/2021 | Wunsche et al. | |
| 2021/0351455 | A1 | 11/2021 | Kim et al. | |
| 2022/0029224 | A1 | 1/2022 | Chung et al. | |
| 2022/0320659 | A1* | 10/2022 | Munjurulimana .. | H01M 50/249 |

FOREIGN PATENT DOCUMENTS

| | | | | |
|---|---|---|---|---|
| JP | 2018188106 | A | * 11/2018 | ............... B60K 1/04 |
| JP | 2019513632 | A | 5/2019 | |
| JP | 2019110003 | A | 7/2019 | |
| KR | 10-2011-0066088 | A | 6/2011 | |
| KR | 10-2017-0079052 | A | 7/2017 | |
| KR | 10-2018-0110969 | A | 10/2018 | |
| KR | 10-2019-0078936 | A | 7/2019 | |
| KR | 10-2019-0131415 | A | 11/2019 | |
| KR | 10-2020-0032456 | A | 3/2020 | |
| KR | 10-2020-0033775 | A | 3/2020 | |
| KR | 10-2020-0065416 | A | 6/2020 | |
| KR | 10-2020-0080470 | A | 7/2020 | |
| KR | 10-2021-0047605 | A | 4/2021 | |
| WO | 2016/084272 | A1 | 6/2016 | |

OTHER PUBLICATIONS

Extended European Search Report dated Jul. 25, 2024, issued in corresponding European Patent Application No. 21880274.2.

Japanese Office Action dated May 28, 2024, issued in corresponding Japanese Patent Application No. 2023-516771.

International Search Report dated Jan. 17, 2022, issued in International Patent Application No. PCT/ KR2021/007925 (with English translation).

* cited by examiner

SIDE FRAME FOR BATTERY CASE

CROSS-REFERENCE OF RELATED APPLICATIONS

This application is the U.S. National Phase under 35 U.S.C. § 371 of International Patent Application No. PCT/KR2021/007925, filed on Jun. 24, 2021, which in turn claims the benefit of Korean Application No. 10-2020-0131082, filed on Oct. 12, 2020, the entire disclosures of which applications are incorporated by reference herein.

TECHNICAL FIELD

The present disclosure relates to a side frame for a battery case formed of heterogeneous materials so as to achieve lightweightedness and cost reductions, as compared to those formed of a single material, while simultaneously sufficiently protecting a battery cell against external impacts.

BACKGROUND ART

For example, a battery system used in an electric vehicle uses various load-bearing members for protecting a battery cell therein.

A representative example thereof may be a side frame for a battery case. The side frame may form a sidewall defining a space in which a battery cell is mounted in the battery case, and may surround the battery cell to protect the battery cell from external impacts.

In addition, the side frame enables a mounting frame necessary for fixing the battery case to a body of a vehicle to be mounted on a side surface of the body.

In general, the side frame and the battery case may be mostly manufactured using aluminum or an aluminum alloy. This may be because such aluminum has advantages such as lightweightedness of the material itself, for example, a degree of freedom in molding or the like that may easily make a side frame having a complicated end surface using an extrusion process.

However, despite the above-mentioned advantages, such aluminum or an aluminum alloy may be much more expensive than steel, and the extrusion process may have a very low production yield, increasing costs thereof.

As related prior art, there is an invention disclosed in Korean Patent Publication No. 2019-0131415 A.

SUMMARY OF INVENTION

Technical Problem

An object of the present disclosure is to provide a side frame for a battery case achieving lightweightedness and cost reductions simultaneously, while sufficiently protecting a battery cell against external impacts.

Solution to Problem

According to an aspect of the present disclosure, a side frame for a battery case includes a first frame unit formed to have an open end surface; and a second frame unit arranged in the first frame unit to close the open end surface of the first frame unit, and coupled to the first frame unit, wherein the first frame unit and the second frame unit are formed of different materials.

According to an aspect of the present disclosure, a side frame for a battery case includes a first frame unit formed to have a closed end surface; and a second frame unit inserted into the first frame unit and coupled to the first frame unit, wherein the first frame unit and the second frame unit are formed of different materials.

Advantageous Effects of Invention

According to an aspect of the present disclosure, a side frame may be formed using heterogeneous materials, to achieve lightweight and cost reduction while exhibiting sufficient structural rigidity, due to even usage of advantages of an extruded material and advantages of a rigid material.

BEST MODE FOR INVENTION

Figure 1:
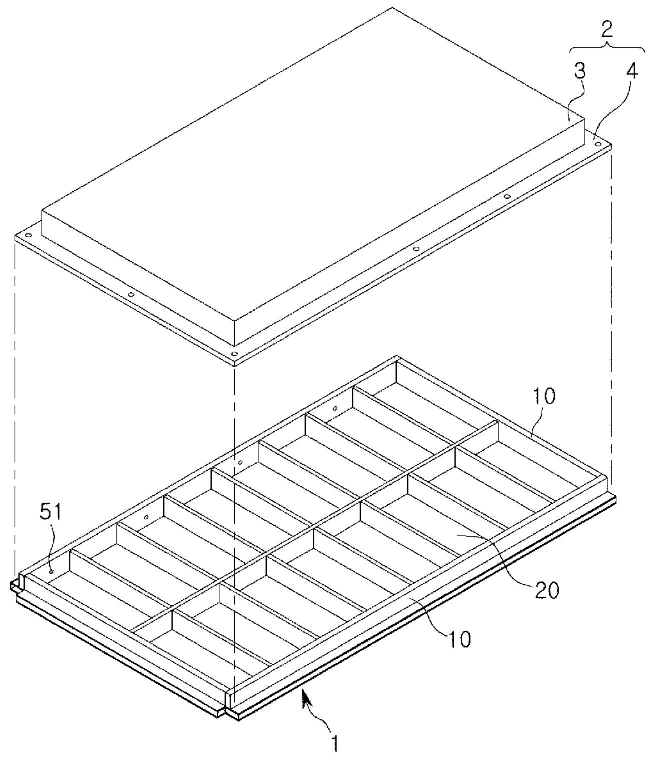
FIG. 1 is a perspective view illustrating a battery case to which a side frame according to the present disclosure is applied.

Hereinafter, the present disclosure will be described in detail with reference to illustrative drawings. In adding reference numerals to components of each of the drawings, it should be noted that the same components are given the same reference numerals as possible even though they are indicated on different drawings.

FIG. 1 is a perspective view illustrating a battery case to which a side frame according to the present disclosure is applied.

The battery case may include a first case 1 and a second case 2.

The first case 1 may include a base plate 20 and a side frame 10 surrounding the base plate. The base plate of the first case may act as a floor material supporting a battery cell, and the side frame may constitute a sidewall of the first case.

The base plate 20 and the side frame 10 may be integrated with each other by welding or the like. Therefore, the first case 1 may have a space in the side frame that forms a closed end surface around the base plate.

For example, at least four side frames 10 may be provided to surround the base plate 20. Both end portions of each of the side frames may be in contact with a corresponding end portion of the other side frame corresponding thereto, and may then be coupled thereto by welding or the like.

The second case 2 may include a body 3 formed as a simple flat plate or having a hollow portion, and a flange 4 formed on an end portion of the body. When the body has the hollow portion, the second case may be manufactured by molding a material having an appropriate strength using a press to have a predetermined shape.

The body 3 of the second case 2 may cover the space of the first case 1 to couple the first and second cases to each other, thereby forming an accommodating space for accommodating the battery cell therein.

The coupling of the first and second cases 1 and 2 may be, for example, undertaken using a bolting process, performed by overlapping the side frame 10 and the flange 4 formed on the end portion of the body 3 each other, and fastening the same with a bolt (not illustrated).

In evaluating performance of the battery case, it may be important to evaluate a side surface collision thereof. The evaluation of a side surface collision may be effectuated by impacting a side surface of a side frame having an approximately rectangular end surface in a battery case with a cylinder formed as a rigid body, to withstand a certain level of collision load. When there is no contact between the side frame and a battery cell until a certain level of collision load is reached, the battery case is evaluated as satisfying collision performance.

In the evaluation of a side surface collision, a deformation mode of the side frame may be largely divided into a buckling mode in a collision early stage and a bending mode in a collision late stage.

The collision early stage may be an initial collision time point of several milliseconds (msec), and, at this time, the side frame may be subjected to concentrated deformation in a portion contacting the rigid body. In the collision early stage, a horizontal member in a width direction (a Y-direction) of a cross-sectional structure of the side frame receives intensive force. As a result, when buckling occurs in the horizontal member, a buckling point may become a plastic hinge to lose a function of the horizontal member as a structural member.

To minimize such phenomena of buckling and plastic hinge, a thickness of a material constituting the side frame should be thick. For example, since an aluminum material is lighter than a steel material, a side frame may be designed to have a high thickness, but the steel material has no choice but to be thin to reduce weight thereof, a side frame formed of the steel material may be very vulnerable to the buckling mode in the collision early stage.

For this reason, a side frame formed of a steel material may be heavier and inferior in terms of performance, as compared to a side frame formed of an aluminum material or an aluminum alloy material.

After the aforementioned buckling mode in the collision early stage is over, a cross-sectional structure of the side frame may be rapidly collapsed, and concentrated deformation may be changed into entire bending deformation of the side frame. That is, deformation of the side frame may be converted to a bending mode of the same form as three-point bending, and in this case, in the cross-sectional structure of the side frame, a role of a vertical member becomes much greater than a role of a horizontal member in a height direction (a Z-direction).

In the bending mode, the vertical member may be subjected to maximum compression or tension, and accordingly, strength of the vertical member may be an important factor. For example, a side frame formed of a high-strength steel material may increase bending resistance, and may be advantageous for withstanding compressive stress or tensile stress generated in the bending mode.

Due to deformation characteristics of the side frame, a thickness of the horizontal member may be important in the collision early stage, and strength of the vertical member may be an important factor in the collision late stage. However, there may be no single material that satisfies both of the above two conditions.

In addition, a conventional battery case may be provided with a mounting frame coupled to one side of the side frame to fix the battery case to a body of a vehicle.

In this case, a member coming into contact with the rigid body in the collision early stage may be the mounting frame. When the side frame is designed to be sufficiently strong, a buckling mode in the collision early stage may occur in the mounting frame, not in the side frame.

Conversely, when the mounting frame is stronger than the side frame, a buckling mode may occur in the side frame.

As above, although the mounting frame also needs the same mechanical consideration as the buckling mode in the collision early stage, mechanical balance between the mounting frame and the side frame may not match since the mounting frame and the side frame are usually manufactured separately and combined by welding or the like. Therefore, the battery case may inevitably have structural weaknesses.

Therefore, in a side frame of a battery case according to the present disclosure, different materials may be applied to a horizontal member and a vertical member, and a mounting frame may be integrated into the side frame, to satisfy mechanical properties required for the side frame and to maximize structural efficiency.

Figure 2:
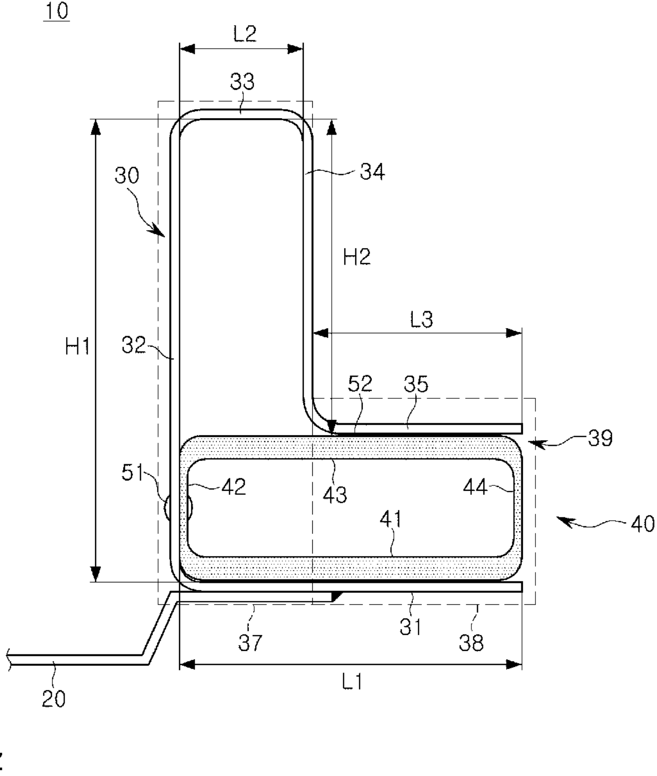
FIG. 2 is a cross-sectional view illustrating a side frame according to a first embodiment of the present disclosure.

FIG. 2 is a cross-sectional view illustrating a side frame according to a first embodiment of the present disclosure.

The side frame 10 according to the first embodiment of the present disclosure may include a first frame unit 30 and a second frame unit 40.

The first frame unit 30 may be formed by bending a single plate having a predetermined width and length, for example, several times to have an L-shaped cross-section. Therefore, the first frame unit may have a hollow portion having an open end surface therein.

The first frame unit 30 may include a first vertical member 32 having a first height H1; a first horizontal member 31 having one end connected to a lower end of the first vertical member and extending in a width direction by a first length L1; a second vertical member 34 spaced apart from the first vertical member by a second length L2, shorter than the first length, and having a second height H2, shorter than the first height; a second horizontal member 33 connecting an upper end of the first vertical member and an upper end of the second vertical member; and a third horizontal member 35 having one end connected to a lower end of the second vertical member and extending in the width direction by a third length L3, shorter than the first length.

The first frame unit 30 may be integrally formed by machining a single plate material such as metal or the like, for example.

For example, a plate material may extend from one end thereof by the first length L1 in the width direction (the Y-direction) to form the first horizontal member 31, and may then be bent once in a first direction (clockwise in FIG. 2). Subsequently, the first vertical member 32 may be formed by rising by the first height H1 in the height direction (the Z-direction), and may then be bent once in the same direction. The second horizontal member 33 may be formed by extending in the width direction by about the second length L2, and may then be bent one more time in the same direction. Subsequently, the second vertical member 34 may be formed by descending in the height direction by the second height H2, and may then be bent once in a second direction (counterclockwise in FIG. 2), opposite to the initial bending direction. Thereafter, the third horizontal member 35 may be formed by extending in the width direction by the third length L3.

In this manner, a desired number of horizontal members 31, 33, and 35 and vertical members 32 and 34 may form an open end surface by repeating a bending method after extending to a predetermined length, and the plate material may then be terminated on the other end.

Therefore, the first frame unit 30 may include a wall portion 37 having the first height H1, and a protrusion portion 38 having one side extending by the third length L3 from the wall portion in the width direction (the Y-direction).

The wall portion 37 may be roughly divided by the first vertical member 32, a portion of the first horizontal member 31, the second vertical member 34, and the second horizontal member 33. The protrusion portion 38 may be formed by the third horizontal member 35 and a portion of the first horizontal member 31 corresponding thereto.

The wall portion 37 may correspond to a conventional side frame, while the protrusion portion 38 may correspond to a conventional mounting frame. Consequently, in the side frame according to the first embodiment of the present disclosure, the mounting frame may be integrated into the side frame, and may be integrally formed with the side frame.

In addition, in the first frame unit 30, the first vertical member 32 and the second vertical member 34 may be spaced apart from each other by the second length L2, and the first horizontal member 31 and the third horizontal member 33 may have an opening portion 39 between an end portion of the first horizontal member and an end portion of the third horizontal member while being spaced apart from each other by a difference in height between the first height H1 and the second height H2.

Therefore, the protrusion portion 38 of the first frame unit 30 may include the opening portion 39, and the protrusion portion and the opening portion may have a height corresponding to the difference in height between the first height H1 and the second height H2.

In this case, a plurality of horizontal members and a plurality of vertical members may not be necessarily formed completely horizontally or vertically, but may have an inclination. Therefore, a separation distance, a difference in height, or the like may be varied.

The first frame unit 30 formed in this manner may form an external shape of the side frame 10.

The first frame unit 30 may be formed to have a predetermined length, and one side surface such as a bottom surface of the first horizontal member 31 may be coupled to the base plate 20 by bonding such as welding or the like.

The second frame unit 40 may be formed to have a predetermined length, and may be formed as a tube member having a substantially rectangular cross-section having a predetermined height and a predetermined width. Therefore, the second frame unit may have a hollow portion of a closed end surface therein.

The second frame unit may include a first transverse member 41 and a second transverse member 43, spaced apart from each other in the height direction (the Z-direction), and a first longitudinal member 42 and a second longitudinal member 44, spaced apart from each other in the width direction (the Y-direction) and connecting the first transverse member and the second transverse member.

In this case, a thickness of each of the first transverse member 41 and the second transverse member 43 may be formed to be thicker than a thickness of each of the first longitudinal member 42 and the second longitudinal member 44. For example, each of the transverse members may have a thickness of at least three times that of each of the longitudinal members.

In addition, at least, the transverse members 41 and 43 of the second frame unit 40 may have a thickness, thicker than a thickness of the first frame unit 30.

A height of the second frame unit 40 may correspond to a height of the opening portion 39 of the first frame unit 30, and a width of the second frame unit may correspond to the first length L1 of the first horizontal member 31 of the first frame unit. In other words, the first transverse member 41 and the second transverse member 43 may have the same length as the first length L1.

The second frame unit 40 may be, at least, disposed in alignment with the protrusion portion 38 in the first frame unit 30, and may close an open end surface of the first frame unit, that is, the opening portion 39, to form entirely the side frame as a closed end surface.

The second frame unit 40 formed and arranged in this manner may form an internal shape of the side frame 10.

In the side frame 10 according to the first embodiment of the present disclosure, the first frame unit 30 and the second frame unit 40 may be formed of different materials.

For example, the first frame unit 30 may be formed of a heavy metal material having a specific gravity of 4 or more, such as a steel material or the like. The second frame unit 40 may be formed of a material having a lower specific gravity than the first frame unit.

Alternatively, the second frame unit 40 may be formed of a material having a higher specific strength than the first frame unit 30.

More specifically, the first frame unit 30 may be formed of, for example, a plate material such as 1470 martensitic (MART) steel having a thickness of about 0.5 mm to about 1.5 mm, produced by the present applicant, or the like. In this case, 1470 MART steel may have a tensile strength of 1,470 MPa or more and a yield strength of 1,050 MPa or more, to improve collision safety.

In this case, the first frame unit 30 may be formed by bending, roll forming, press forming, or the like.

In addition, the second frame unit 40 may be formed of a material that may be molded by extrusion, for example, a light metal such as aluminum or the like, an alloy thereof, a plastic, a composite material, or the like.

As such, since the first frame unit 30 and the second frame unit 40 may be formed of heterogeneous materials, the first frame unit and the second frame unit may be coupled to each other by mechanical bonding through a fixture such as a rivet 51 or the like, and by chemical bonding through an adhesive 52 such as, a structural adhesive or the like.

When assembling the side frame 10 according to the first embodiment of the present disclosure, first, the second frame unit may be inserted into the protrusion portion 38 in the first frame unit, while the first frame unit 30 and the second frame unit 40, formed separately, are moved relative to each other in a length direction (the X-direction).

Subsequently, the first vertical member 32 of the first frame unit 30 may be coupled to the first longitudinal member 42 of the second frame unit 40 by the rivet 51. The adhesive 52 may be interposed between the first horizontal member 31 of the first frame unit and the first transverse member 41 of the second frame unit, and between the third horizontal member 35 of the first frame unit and the second transverse member 43 of the second frame unit, to be bonded to each other.

It is possible to obtain effects of preventing corrosion caused not only by the coupling between the first frame unit and the second frame unit 40, but also by the direct contact of heterogeneous materials, for example, when the first frame unit is formed of a steel material and the second frame unit is formed of an aluminum material, by the usage of the adhesive 52.

Of course, the assembly method is not necessarily limited to the above-described example, and the fixture such as the rivet 51 and the adhesive 52 such as a structural adhesive may be combined together, to be used for coupling the first frame unit 30 and the second frame unit 40.

Therefore, the second frame unit 40 of a lightweight material may provide an additional horizontal member (i.e., the second transverse member 43) in the first frame unit 30 of a high strength material, or may, at least, further add thicknesses of the first and third horizontal members 31 and 35.

The side frame 10 according to the first embodiment of the present disclosure may realize a very efficient structure of high performance and low cost, by including the first frame unit 30 and the second frame unit 40, formed of heterogeneous materials, arranging the lightweight material to a portion requiring the thick horizontal member, arranging the high-strength material on the vertical member requiring strength, and integrating the mounting frame with the side frame.

Therefore, it is possible to prevent phenomena of buckling and plastic hinge by the thick horizontal member in the collision early stage, and it is possible to respond to bending deformation by the high-strength vertical member in the collision late stage.

In addition, considering a role of the mounting frame that receives an initial impact, the horizontal member may be extended to a position of an existing mounting frame and an outer side may be surrounded with a high-strength material, to satisfy mechanical properties and maximize structural efficiencies only by the side frame.

Figure 3:
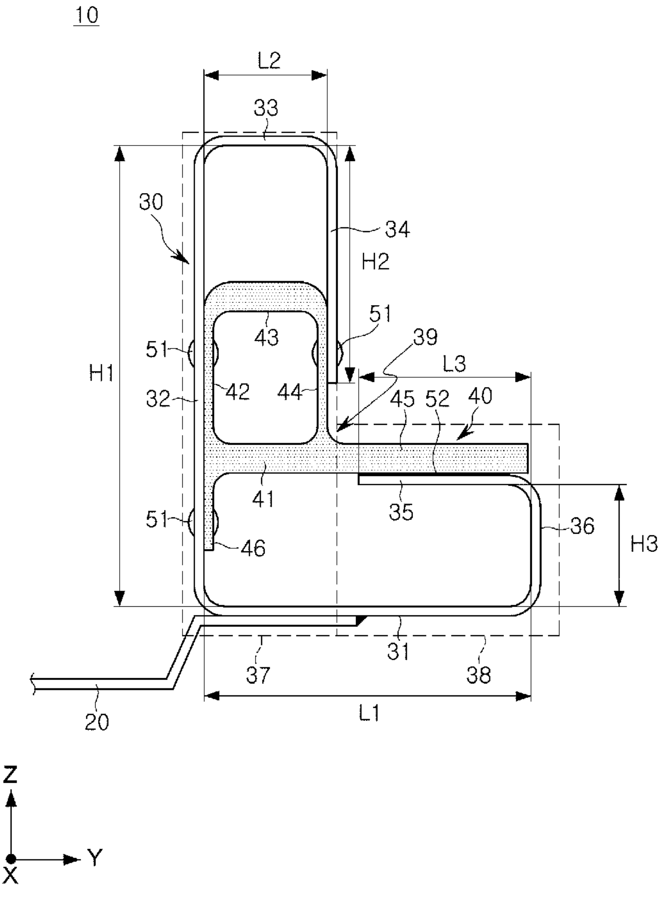
FIG. 3 is a cross-sectional view illustrating a side frame according to a second embodiment of the present disclosure.

FIG. 3 is a cross-sectional view illustrating a side frame according to a second embodiment of the present disclosure.

The side frame 10 according to the second embodiment of the present disclosure may include a first frame unit 30 and a second frame unit 40.

The first frame unit 30 may be formed by bending a single plate material having a predetermined width and length, for example, several times to have an L-shaped cross-section. Therefore, the first frame unit may have a hollow portion having an open end surface therein.

The first frame unit 30 may include a first vertical member 32 having a first height H1; a first horizontal member 31 having one end connected to a lower end of the first vertical member and extending in a width direction by a first length L1; a second vertical member 34 spaced apart from the first vertical member by a second length L2, shorter than the first length, and having a second height H2, shorter than the first height; a second horizontal member 33 connecting an upper end of the first vertical member and an upper end of the second vertical member; a third vertical member 36 having a lower end connected to the other end of the first horizontal member and having a third height H3, shorter than the first height; and a third horizontal member 35 having one end connected to an upper end of the third vertical member and extending in the width direction by a third length L3, shorter than the first length, toward the first vertical member.

The first frame unit 30 may be integrally formed by machining a single plate material such as metal or the like, for example.

For example, a plate material may extend from one end thereof by the third length L3 in the width direction (the Y-direction) to form the third horizontal member 35, and may then be bent once in a first direction (clockwise in FIG. 3). Subsequently, the third vertical member 36 may be formed by descending by the third height H3 in the height direction (the Z-direction), and may then be bent once in the same direction. Subsequently, the first horizontal member 31 may be formed by extending by the first length L1 in the width direction, and may then be bent one more time in the same direction. Subsequently, the first vertical member 32 may be formed by rising by the first height H1 in the height direction, and may then be bent once in the same direction. The second horizontal member 33 may be formed by extending by the second length L2 in the width direction, and may then be bent once more in the same direction. Thereafter, the second vertical member 34 may be formed by descending by the second height H2 in the height direction.

In this manner, a desired number of horizontal members 31, 33, and 35 and vertical members 32, 34, and 36 may form an open end surface by repeating a bending method after extending to a predetermined length, and the plate material may then be terminated on the other end.

Therefore, the first frame unit 30 may include a wall portion 37 having the first height H1, and a protrusion portion 38 having one side extending by the third length L3 or slightly longer than the third length L3 from the wall portion in the width direction (the Y-direction).

The wall portion 37 may be roughly divided by the first vertical member 32, a portion of the first horizontal member 31, the second vertical member 34, and the second horizontal member 33. The protrusion portion 38 may be divided by the third horizontal member 35 and a portion of the first horizontal member 31 corresponding thereto, and the third vertical member 36.

In the side frame 10 according to the second embodiment of the present disclosure, the mounting frame may be integrated into the side frame to be integrally formed with the side frame.

In addition, in the first frame unit 30, the first vertical member 32 and the second vertical member 34 may be spaced apart from each other by the second length L2, and the first vertical member 32 and the third vertical member 36 may be spaced apart from each other by the first length L1.

In addition, the first frame unit 30 may have an opening portion 39 between an end portion of the second vertical member 34 and an end portion of the third horizontal member 35.

Therefore, the first frame unit 30 may include the opening portion 39 between the wall portion 37 and the protrusion portion 38, and the opening portion may have a height corresponding to the remainder after subtracting the sum of the second height H2 and the third height H3 from the first height H1.

In this case, a plurality of horizontal members and a plurality of vertical members may not be necessarily formed completely horizontally or vertically, but may have an inclination. Therefore, a separation distance, a difference in height, or the like may be varied.

The first frame unit 30 formed in this manner may form an external shape of the side frame 10.

The first frame unit 30 may be formed to have a predetermined length, and one side surface such as a bottom surface of the first horizontal member 31 may be coupled to the base plate 20 by bonding such as welding or the like.

The second frame unit 40 may be formed to have a predetermined length, and may be formed as a tube member having a substantially rectangular cross-section having a predetermined height and a predetermined width. Therefore, the second frame unit may have a hollow portion of a closed end surface therein.

The second frame unit may include a first transverse member 41 and a second transverse member 43, spaced apart from each other in the height direction (the Z-direction), and a first longitudinal member 42 and a second longitudinal member 44, spaced apart from each other in the width direction (the Y-direction) and connecting the first transverse member and the second transverse member.

The second frame unit 40 may further include a third transverse member 45 extending from the second longitudinal member 44 to be continuous to or parallel to the first transverse member 41, and a third longitudinal member 46 extending from the first transverse member 41 to be continuous to or parallel to the first longitudinal member 42.

In this case, a thickness of each of the first transverse member 41, the second transverse member 43, and the third transverse member 45 may be formed to be thicker than a thickness of each of the first longitudinal member 42, the second longitudinal member 44, and the third longitudinal member 46. For example, each of the transverse members may have a thickness at least three times that of each of the longitudinal members.

In addition, at least, the transverse members 41, 43, and 45 of the second frame unit 40 may have a thickness, thicker than a thickness of the first frame unit 30.

In the second frame unit 40, the first transverse member 41 and the second transverse member 43 may have the same length as the second length L2.

The second frame unit 40 may be arranged in alignment with, at least, the wall portion 37 in the first frame unit 30, and closes the open end surface of the first frame unit, that is, the opening portion 39, to form entirely the side frame 10 as a closed end surface.

The third longitudinal member 46 of the second frame unit may be supported by the first vertical member 32 of the first frame unit 30.

The third transverse member 45 of the second frame unit may be disposed on the third horizontal member 35 of the first frame unit 30.

However, an arrangement of the third transverse member of the second frame unit 40 is not necessarily limited thereto. For example, the third transverse member of the second frame unit may be disposed between the third horizontal member 35 and the first horizontal member 31 in the first frame unit 30, and an end portion of the third transverse member may be supported to contact the third vertical member 36 of the first frame unit.

The second frame unit 40 formed and arranged in this manner may form an internal shape of the side frame 10.

In the side frame 10 according to the second embodiment of the present disclosure, the first frame unit 30 and the second frame unit 40 may be formed of different materials, as in the first embodiment.

For example, the first frame unit 30 may be formed of a heavy metal material such as a steel material or the like. The second frame unit 40 may be formed of a material having a lower specific gravity than the first frame unit.

Alternatively, the second frame unit 40 may be formed of a material having a higher specific strength than the first frame unit 30.

More specifically, the first frame unit 30 may be made of, for example, a plate material such as 1470 MART steel having a thickness of about 0.5 mm to about 1.5 mm, produced by the present applicant, or the like.

In this case, the first frame unit 30 may be formed by bending, roll forming, press forming, or the like.

In addition, the second frame unit 40 may be formed of a material that may be molded by extrusion, for example, a light metal such as aluminum or the like, an alloy thereof, a plastic, a composite material, or the like.

As such, since the first frame unit 30 and the second frame unit 40 may be formed of heterogeneous materials, the first frame unit and the second frame unit may be coupled to each other by mechanical bonding through a fixture such as a rivet 51 or the like, and by chemical bonding through an adhesive 52 such as, a structural adhesive or the like.

When assembling the side frame 10 according to the second embodiment of the present disclosure, first, the second frame unit may be inserted into the wall portion 37 in the first frame unit, while the first frame unit 30 and the second frame unit 40, formed separately, are moved relative to each other in a length direction (the X-direction).

Subsequently, the first vertical member 32 of the first frame unit 30 may be coupled to the first longitudinal member 42 of the second frame unit 40 by the rivet 51. The second vertical member 34 of the first frame unit may be coupled to the second longitudinal member 44 of the second frame unit by the rivet 51. The adhesive 52 may be interposed between the third horizontal member 35 of the first frame unit 30 and the third transverse member 45 of the second frame unit 40, to be bonded to each other.

It is possible to obtain effects of preventing corrosion caused not only by the coupling between the first frame unit 30 and the second frame unit 40, but also by the direct contact of heterogeneous materials, for example, when the first frame unit is formed of a steel material and the second frame unit is formed of an aluminum material, by the usage of the adhesive 52.

Of course, the assembly method is not necessarily limited to the above-described example, and the fixture such as the rivet 51 and the adhesive 52 such as a structural adhesive may be combined together, to be used for coupling the first frame unit 30 and the second frame unit 40.

Therefore, the second frame unit 40 of a lightweight material may provide an additional horizontal member (i.e., the first transverse member 41 and the second transverse member 43) in the first frame unit 30 of a high strength material, or may, at least, further add a thickness of the third horizontal members 35.

The side frame 10 according to the second embodiment of the present disclosure may realize a very efficient structure of high performance and low cost, by including the first frame unit 30 and the second frame unit 40, formed of heterogeneous materials, arranging the lightweight material to a portion requiring the thick horizontal member, arranging the high-strength material on the vertical member requiring strength, and integrating the mounting frame with the side frame.

Therefore, it is possible to prevent phenomena of buckling and plastic hinge by the thick horizontal member in the collision early stage, and it is possible to respond to bending deformation by the high-strength vertical member in the collision late stage.

In addition, considering a role of the mounting frame that receives an initial impact, the horizontal member may be extended to a position of an existing mounting frame and an outer side may be surrounded with a high-strength material, to satisfy mechanical properties and maximize structural efficiencies only by the side frame.

Figure 4:
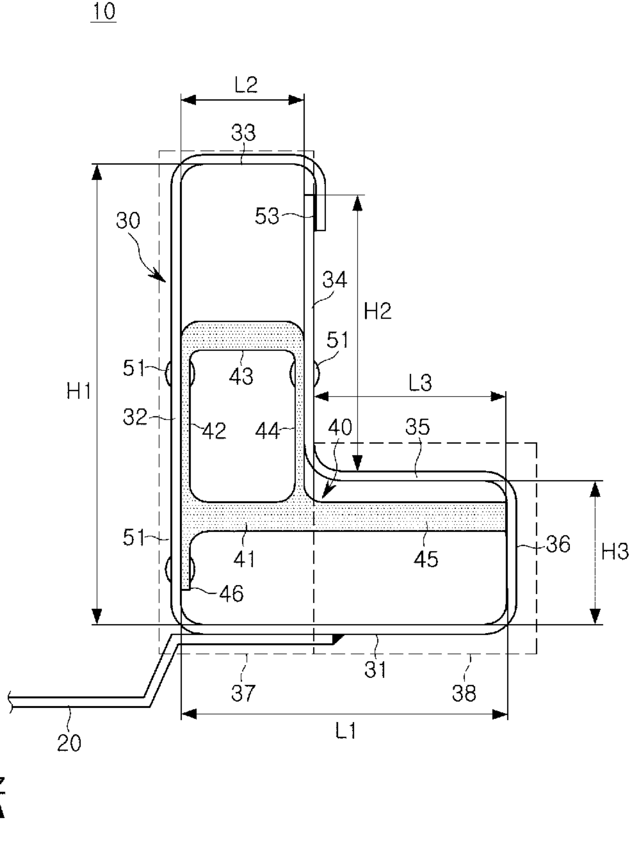
FIG. 4 is a cross-sectional view illustrating a side frame according to a third embodiment of the present disclosure.

FIG. 4 is a cross-sectional view illustrating a side frame according to a third embodiment of the present disclosure.

The side frame 10 according to the third embodiment of the present disclosure may include a first frame unit 30 and a second frame unit 40.

The first frame unit 30 may be formed by bending a single plate material having a predetermined width and length, for example, several times to have an L-shaped cross-section, and then welding contacted end portions. Therefore, the first frame unit may have a hollow portion of a closed end surface therein.

The first frame unit 30 may include a first vertical member 32 having a first height H1; a first horizontal member 31 having one end connected to a lower end of the first vertical member and extending in a width direction by a first length L1; a second vertical member 34 spaced apart from the first vertical member by a second length L2, shorter than the first length, and having a second height H2, shorter than the first height; a second horizontal member 33 connecting an upper end of the first vertical member and an upper end of the second vertical member; a third vertical member 36 having a lower end connected to the other end of the first horizontal member and having a third height H3, shorter than the first height; and a third horizontal member 35 connecting a lower end of the second vertical member and an upper end of the third vertical member, and having a third length L3, shorter than the first length.

The first frame unit 30 may be integrally formed by machining a single plate material such as metal or the like, for example.

For example, a plate material may be lowered from one end thereof by the second height H2 in the height direction (the Z-direction) to form the second vertical member 34, and may then be bent once in the second direction (counter-clockwise in FIG. 4). Subsequently, the third horizontal member 35 may be formed by extending by the third length L3 in the width direction (the Y-direction), and may then be bent once in the first direction (clockwise in FIG. 4), opposite to the initial bending direction. Subsequently, the third vertical member 36 may be formed by descending by the third height H3 in the height direction, and may then be bent once in the same first direction. Subsequently, the first horizontal member 31 may be formed by extending by the first length L1 in the width direction, and may then be bent once in the same direction. Subsequently, the first vertical member 32 may be formed by ascending by the first height H1 in the height direction, and may then be bent once in the same direction. The second horizontal member 33 may be formed by extending by the second length L2 in the width direction, and may then be bent once more in the same direction. Then, the other end of the plate material may be welded to one end to form a welded portion 53.

In this manner, after extending to a predetermined length and then bending the bending method may be repeated to form a closed end surface, together with a desired number of horizontal members 31, 33, and 35 and vertical members 32, 34, and 36, and both ends of the plate material may then be connected by welding.

Therefore, the first frame unit 30 may include a wall portion 37 having the first height H1, and a protrusion portion 38 having one side extending by the third length L3 from the wall portion in the width direction (the Y-direction).

The wall portion 37 may be roughly divided by the first vertical member 32, a portion of the first horizontal member 31, the second vertical member 34, and the second horizontal member 33. The protrusion portion 38 may be divided by the third horizontal member 35 and a portion of the first horizontal member 31 corresponding thereto, and the third vertical member 36.

In the side frame 10 according to the third embodiment of the present disclosure, the mounting frame may be integrated into the side frame to be integrally formed with the side frame.

In addition, in the first frame unit 30, the first vertical member 32 and the second vertical member 34 may be spaced apart from each other by the second length L2, and the first vertical member 32 and the third vertical member 36 may be spaced apart from each other by the first length L1.

Also, in the first frame unit 30, the first horizontal member 31 and the third horizontal member 35 may be spaced apart from each other by the third height H3.

In this case, a plurality of horizontal members and a plurality of vertical members may not be necessarily formed completely horizontally or vertically, but may have an inclination. Therefore, a separation distance or the like may be varied.

The first frame unit 30 formed in this manner may form an external shape of the side frame 10.

The first frame unit 30 may be formed to have a predetermined length, and one side surface such as a bottom surface of the first horizontal member 31 may be coupled to the base plate 20 by bonding such as welding or the like.

The second frame unit 40 may be formed to have a predetermined length, and may be formed as a tube member having a substantially rectangular cross-section having a predetermined height and a predetermined width. Therefore, the second frame unit may have a hollow portion of a closed end surface therein.

The second frame unit 40 may include a first transverse member 41 and a second transverse member 43, spaced apart from each other in the height direction (the Z-direction), and a first longitudinal member 42 and a second longitudinal member 44, spaced apart from each other in the width direction (the Y-direction) and connecting the first transverse member and the second transverse member.

The second frame unit 40 may further include a third transverse member 45 extending from the second longitudinal member 44 to be continuous to or parallel to the first transverse member 41, and a third longitudinal member 46 extending from the first transverse member 41 to be continuous to or parallel to the first longitudinal member 42.

In this case, a thickness of each of the first transverse member 41, the second transverse member 43, and the third transverse member 45 may be formed to be thicker than a thickness of each of the first longitudinal member 42, the second longitudinal member 44, and the third longitudinal member 46. For example, each of the transverse members may have a thickness of at least three times that of each of the longitudinal members.

In addition, at least, the transverse members 41, 43, and 45 of the second frame unit 40 may have a thickness, thicker than a thickness of the first frame unit 30.

In the second frame unit 40, the first transverse member 41 and the second transverse member 43 may have the same length as the second length L2. The second frame unit may be arranged in alignment with, at least, the wall portion 37 in the first frame unit.

The third longitudinal member 46 of the second frame unit 40 may be supported by the first vertical member 32 of the first frame unit 30.

The third transverse member 45 of the second frame unit may be disposed between the third horizontal member 35 and the first horizontal member 31 in the first frame unit 30, and an end portion of the third transverse member may be supported to contact the third vertical member 36 of the first frame unit.

The second frame unit 40 formed and arranged in this manner may form an internal shape of the side frame 10.

In the side frame 10 according to the third embodiment of the present disclosure, the first frame unit 30 and the second frame unit 40 may be formed of different materials, as in the first and second embodiments.

For example, the first frame unit 30 may be formed of a heavy metal material such as a steel material or the like. The second frame unit 40 may be formed of a material having a lower specific gravity than the first frame unit.

Alternatively, the second frame unit 40 may be formed of a material having a higher specific strength than the first frame unit 30.

More specifically, the first frame unit 30 may be made of, for example, a plate material such as 1470 MART steel having a thickness of about 0.5 mm to about 1.5 mm, produced by the present applicant, or the like.

In this case, the first frame unit 30 may be formed by roll forming or the like.

In addition, the second frame unit 40 may be formed of a material that may be molded by extrusion, for example, a light metal such as aluminum or the like, an alloy thereof, a plastic, or a composite material.

As such, since the first frame unit 30 and the second frame unit 40 may be formed of heterogeneous materials, the first frame unit and the second frame unit may be coupled to each other by mechanical bonding through a fixture such as a rivet 51 or the like, and by chemical bonding through an adhesive 52 such as, a structural adhesive or the like (please refer to FIG. 2 or FIG. 3).

When assembling the side frame 10 according to the third embodiment of the present disclosure, first, the second frame unit may be inserted into the wall portion 37 in the first frame unit, while the first frame unit 30 and the second frame unit 40, formed separately, are moved relative to each other in a length direction (the X-direction).

Subsequently, the first vertical member 32 of the first frame unit 30 may be coupled to the first longitudinal member 42 and the third longitudinal member 46 in the second frame unit by the rivet 51. The second vertical member 34 of the first frame unit may be coupled to the second longitudinal member 44 of the second frame unit by the rivet 51.

However, the assembling method is not necessarily limited to the above example, and the fixture such as the rivet 51 and the adhesive such as a structural adhesive may be combined together, to be used for coupling the first frame unit 30 and the second frame unit 40.

Therefore, the second frame unit 40 of a lightweight material may provide an additional horizontal member (i.e., the first transverse member 41 and the second transverse member 43) in the first frame unit 30 of a high strength material.

The side frame 10 according to the third embodiment of the present disclosure may realize a very efficient structure of high performance and low cost, by including the first frame unit 30 and the second frame unit 40, formed of heterogeneous materials, arranging the lightweight material to a portion requiring the thick horizontal member, arranging the high-strength material on the vertical member requiring strength, and integrating the mounting frame with the side frame.

Therefore, it is possible to prevent phenomena of buckling and plastic hinge by the thick horizontal member in the collision early stage, and it is possible to respond to bending deformation by the high-strength vertical member in the collision late stage.

In addition, considering a role of the mounting frame that receives an initial impact, the horizontal member may be extended to a position of an existing mounting frame and an outer side may be surrounded with a high-strength material, to satisfy mechanical properties and maximize structural efficiencies only by the side frame.

Figure 5:
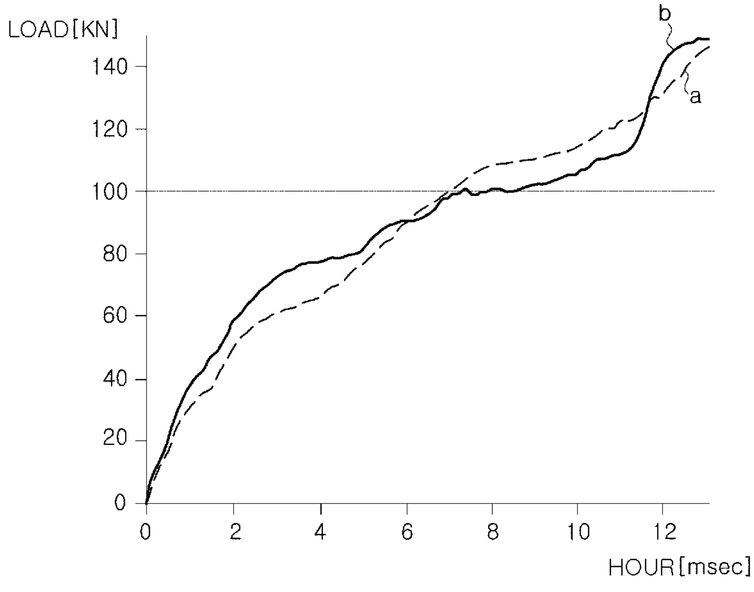
FIG. 5 is a graph comparing performance of a side frame formed of a conventional aluminum material and performance of a side frame formed of heterogeneous materials according to the present disclosure, during collisions of side surfaces thereof.

FIG. 5 is a graph comparing performance of a side frame formed of a conventional aluminum material and performance of a side frame formed of heterogeneous materials according to the present disclosure, during collisions of side surfaces thereof.

The present applicant performed performance analysis by simulation for a side frame according to the second embodiment of the present disclosure.

In relation to performance of enduring a certain level of impact load by impacting a side surface of the side frame with a cylinder formed as a rigid body, a degree of deformation of a conventional side frame formed only of a virtual aluminum extruded material (line b in FIG. 5) and a degree of deformation of the side frame according to the second embodiment of the present disclosure (line b in FIG. 5) were compared.

In the side frame according to the second embodiment of the present disclosure, the first frame unit was formed by roll forming using 1470 MART steel, and the second frame unit was formed by extruding 6000 series aluminum.

Results of the performance analysis were illustrated in Table 1 below.

TABLE 1

| | Weight (Kg) | Weight Ratio | Displacement @100KN (mm) | Cost vs. Material |
|---|---|---|---|---|
| a: Conventional Side Frame | 9.742 | 100 | 3.55 | 100 |
| b: Inventive Side Frame | 8.342 | 86 | 3.70 | 44 |

An amount of deformation (displacement) in a side frame of the present disclosure, formed of heterogeneous materials, is similar to that of a conventional side frame to which an aluminum extrusion material is applied, and there was no contact with a battery cell. Moreover, it was confirmed that, in the side frame of the present disclosure, while satisfying the same performance, a weight ratio thereof was reduced to about 86%, and cost with regard to a material was reduced to about 44%, to have a very efficient structure, compared to the conventional side frame.

As described above, according to the present disclosure, a side frame formed of heterogeneous materials may be formed by evenly using advantages of an extruded material and advantages of a rigid material, thereby exhibiting sufficient structural rigidity as well as reducing weight and reducing costs.

The above description is merely illustrative of the technical spirit of the present disclosure, and various modifications and variations will be possible without departing from essential characteristics of the present disclosure by those skilled in the art to which the present disclosure pertains.

In this specification and drawings, only an example in which the second frame unit has a substantially rectangular cross-section is described and illustrated, but the cross-sectional shape of the second frame unit is not limited thereto, and may have an open end surface of, for example, an oval or any other polygonal cross-section, or an arc shape or a U-shape.

In addition, the horizontal member of the first frame unit and the transverse member of the second frame unit, and the vertical member of the first frame unit and the longitudinal member of the second frame unit may be used only for the purpose of distinguishing the terms, and are apparently intended not to have different technical meanings.

The above and illustrated embodiments of the present disclosure may be combined with each other, and each of the embodiments may optionally employ some components of other embodiments, as needed.

While example embodiments have been illustrated and described above, it will be apparent to those skilled in the art that modifications and variations could be made without departing from the scope of the present disclosure as defined by the appended claims.

INDUSTRIAL APPLICABILITY

As described above, the present disclosure may be useful, for example, in an electric vehicle equipped with a battery system.

The invention claimed is:

1. A side frame for a battery case comprising:

a first frame unit formed to have an open end surface; and a second frame unit arranged in the first frame unit to close the open end surface of the first frame unit, and coupled to the first frame unit, wherein the first frame unit and the second frame unit are formed of different materials, wherein the first frame unit comprises:

a first vertical member having a first height;

a first horizontal member having one end connected to a lower end of the first vertical member and extending in a width direction by a first length;

a second vertical member spaced apart from the first vertical member by a second length, shorter than the first length, and having a second height, shorter than the first height;

a second horizontal member connecting an upper end of the first vertical member and an upper end of the second vertical member; and a third horizontal member having one end connected to a lower end of the second vertical member and extending in the width direction by a third length, shorter than the first length, wherein an opening portion is formed between the other end of the first horizontal member and the other end of the third horizontal member.

2. The side frame of claim 1, wherein the first frame unit comprises:

a wall portion having the first height; and a protrusion portion having one side extending by the third length from the wall portion in the width direction, wherein the opening portion is formed on the one side of the protrusion portion.

3. The side frame of claim 2, wherein the second frame unit is at least disposed on the protrusion portion in the first frame unit, to close the opening portion.

4. The side frame of claim 1, wherein the second frame unit comprises:

a first transverse member and a second transverse member, spaced apart from each other in a height direction; and a first longitudinal member and a second longitudinal member, spaced apart from each other in the width direction and connecting the first transverse member and the second transverse member.

5. The side frame of claim 4, wherein a thickness of each of the first transverse member and the second transverse member is formed to be thicker than a thickness of each of the first longitudinal member and the second longitudinal member.

6. The side frame of claim 4, wherein the first transverse member and the second transverse member have a thickness, thicker than a thickness of the first frame unit.

7. The side frame of claim 4, wherein the first transverse member and the second transverse member have a length, equal to the first length, the first longitudinal member is coupled to the first vertical member by mechanical bonding, and the first horizontal member is coupled to the first transverse member by chemical bonding, and the third horizontal member is coupled to the second transverse member by chemical bonding.

* * * * *